United States Patent [19]
Harzer et al.

[11] 3,800,184
[45] Mar. 26, 1974

[54] OSCILLOSCOPIC SYSTEM TO DETECT DISTORTION DUE TO TRANSIENTS

[75] Inventors: Peter Harzer, Eningen; Karl Benzel, Dettingen, both of Germany

[73] Assignee: Wandel & Goltermann, Reutlingen, Germany

[22] Filed: Nov. 30, 1971

[21] Appl. No.: 203,280

[30] Foreign Application Priority Data
Dec. 2, 1970 Germany.......................... 2059225

[52] U.S. Cl. ............. 315/26, 324/57 PI, 324/77 CS
[51] Int. Cl. .......................................... H01j 29/70
[58] Field of Search ............ 324/57 PI, 57 SS, 57 R, 324/57 N, 77 CS, 77 CC, 121; 315/26

[56] References Cited
UNITED STATES PATENTS

| | | | |
|---|---|---|---|
| 3,182,254 | 5/1965 | Feldman et al. .................. | 324/77 C |
| 3,419,799 | 12/1968 | Papadeas.......................... | 324/57 PI |
| 3,403,333 | 9/1968 | Wooten............................. | 324/57 R |
| 3,241,059 | 3/1966 | Wie................................... | 324/77 CS |

FOREIGN PATENTS OR APPLICATIONS

576,158  3/1946  Great Britain....................... 315/26

Primary Examiner—Maynard R. Wilbur
Assistant Examiner—J. M. Potenza
Attorney, Agent, or Firm—Karl F. Ross; Herbert Dubno

[57] ABSTRACT

An oscillator of variable operating frequency, working into an object whose transmission characteristics (e.g. attenuation) for a range of frequencies are to be visualized on the screen of a cathode-ray tube, is controlled by a modulating voltage from a sawtooth-wave generator also feeding the horizontal-sweep circuit of the tube. A manual switch, when tripped, momentarily lowers the cadence of the sawtooth-wave generator, either one or more times per cycle or during alternate cycles, to enable visual ascertainment of any distortion of the oscilloscopic trace due to transients.

10 Claims, 9 Drawing Figures

Peter Harzer
Karl Benzel
INVENTORS.

BY

Karl J. Ross
Attorney

OSCILLOSCOPIC SYSTEM TO DETECT DISTORTION DUE TO TRANSIENTS

Our present invention relates to a system for visually displaying a frequency-dependent parameter of a test pad or circuit on an oscilloscope screen.

In several commonly owned U.S. Pats., including Nos. 3,461,385 and 3,584,295, means have been disclosed for energizing such a test circuit with a continuously varying test frequency, with conversion of the alternating output voltage into a d-c message signal indicating the attenuation and/or phase characteristic of the cricuit throughout a selected frequency band. Such a variable test frequency may be obtained from an oscillator provided with an electronically adjustable reactance (such as a varactor) in its tank circuit, the control voltage for this reactance being delivered by a time-base generator having a repetition frequency substantially lower than the minimum operating frequency of the controlled oscillator. The output of the controlling generator is advantageously a sawtooth wave, though a symmetrically triangular wave could also be used. This output is also fed to one of the sweep circuits of the oscilloscope, i.e., to the one which deflects the beam in the "$x$" direction (referred to hereinafter for convenience as horizontal), the deflection in the conjugate "$y$" direction (referred to hereinafter as vertical) being due to a frequency-dependent input signal which may be the output of the test pad demodulated in amplitude or in phase to provide a measure of the attenuation or the phase shift of that pad.

If the cadence of the horizontal sweep (i.e., the rate of frequency change in the test circuit) is too high, transients developing in that circuit may not decay rapidly enough to make the vertical deflection truly proportional to the transmission characteristic for a corresponding test frequency, especially at points where the parameter to be measured varies sharply between narrow frequency limits. Since these transients are generally different for rising and falling frequencies, a symmetrically triangular sweep reveals the excessive sweep rate by an at least intermittent blurring or broadening of the luminous trace. The operator, on noting the apparent defocusing of the display, may then reduce the sweep rate until the picture appears sharp and clear.

This technique has not heretofore been available with the less complicated sawtooth-sweep generators which do not require coincidence between the forward and backward scans and which therefore inherently produce sharper and steadier traces. In such systems, therefore, an operator attempting to avoid flicker by the selection of a high sweep rate will not be aware of any distortion introduced thereby.

The object of our invention, accordingly, is to provide a method of and means for visually indicating an excessive sweep rate in a system of this character utilizing a sawtooth-wave generator for the horizontal deflection, thus enabling optimization of the repetition frequency or cadence of the sweep voltage or current produced by that generator.

In accordance with the present invention we provide control means which may be operated, e.g. by a pushbutton, independently of a manual sweep-frequency selector to reduce the repetition frequency of the sawtooth-wave generator, thereby temporarily lowering the sweep rate to a value substantially less than the one established by the selector.

Upon such lowering of the cadence of the time-base signal produced by the sawtooth-wave generator, the operator may observe the degree of coincidence between two traces projected with the normal and with the reduced sweep rate and, in the event of imperfect registry therebetween, may reset the sweeprate selector to reduce the normal sweep rate until the traces practically coincide.

Advantageously, pursuant to a more particular feature of our invention, the operation of the pushbutton or equivalent control means establishes, electronically or by the closure of mechanical contacts, a switchover circuit including a source of switching pulses whose duration may equal a full sweep cycle or a fraction of such cycle and which recur periodically, during every $n^{th}$ cycle (with $n$ preferably equal to 2) or several times within the same cycle, at intervals which are short compared with the period of luminous persistence of the oscilloscope screen and/or of visual retention of the human retina to give a continuous image of the entire trace or of some portion or portions thereof.

If the selected (normal) sweep rate is relatively high, so that even a substantial reduction thereof does not cause objectionable flicker, such reduction may take place for a full cycle during alternate sweeps to provide a full reference trace. If the selected rate is low, an intermittent reduction (possibly to zero) during a small fraction of a normal sweep cycle is preferred. In fact, we may couple the switchover circuit to the manual selector in such a way as to establish the first mode of rate reduction in a range of relatively high repetition frequencies and the second mode of rate reduction in a range of relatively low repetition frequencies.

The invention will be described in greater detail hereinafter with reference to the accompanying drawing in which.

Figure 1:
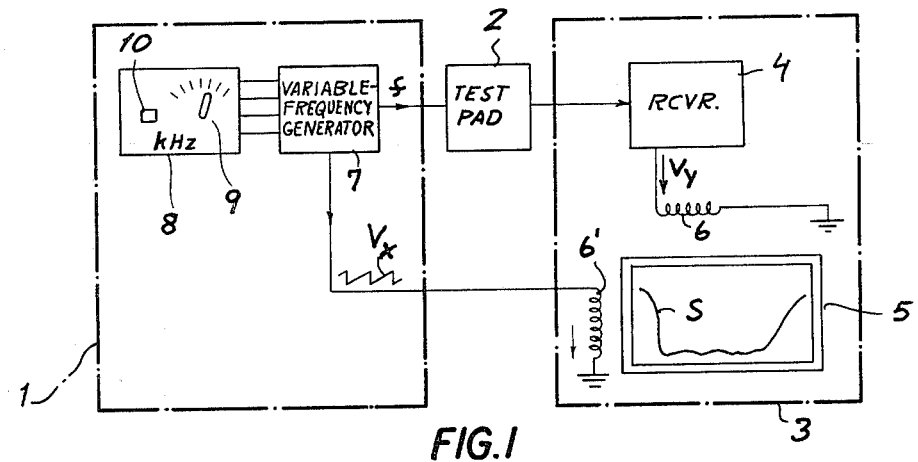
FIG. 1 is a block diagram of a representative embodiment.

In FIG. 1 we have shown a system comprising, basically, a transmitting section 1 and a receiving section 3 at the input end and at the output end of a transmission path which includes a test pad 2 to be checked for certain frequency-related parameters such as attenuation and/or phase angle. Section 1 includes a variable-frequency generator 7, more fully illustrated in FIGS. 5 and 6 described hereinafter, producing an oscillation of frequency $f$ which is transmitted to a receiver 4 in section 3 by way of pad 2. Generator 7 further emits a sawtooth voltage $V_x$, proportional to operating frequency $f$, which energizes a horizontal-deflection coil 6' of a cathode-ray tube 25 (FIG. 5) in section 3 also having a vertical-deflection coil 6 energized by a signal voltage $V_y$ in the output of receiver 4 representing the parameter to be tested. As a result, there appears on a fluorescent screen 5 of the tube a trace S visually indicating the variations of that parameter as a function of frequency $f$.

The repetition frequency and therefore the cycle length of sawtooth voltage $V_x$ is adjustable with the aid of a manual selector 9 shown as a switch arm on a dial which may be calibrated directly in kHz to give a reading of the magnitude of frequency $f$ corresponding to each setting. An instrument panel 8, carrying the selector 9, also supports a pushbutton 10 serving as a control element for the optional lowering of the repetition frequency of voltage $V_x$ as more fully described hereinafter.

Figure 2:
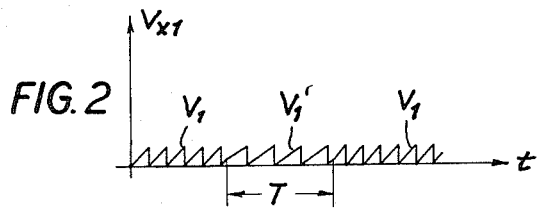
FIGS. 2, 3 and 4 are graphs showing the output of a sweep-voltage generator with three different modes of operation.
Figure 2A:
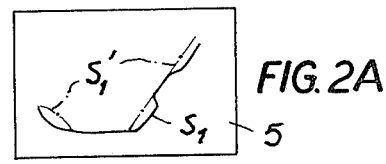
FIGS. 2A, 3A and 4A show traces on an oscilloscope screen produced with the sweep voltages of FIGS. 2, 3 and 4, respectively.

As illustrated in FIG. 2, a sweep voltage $V_{x1}$ plotted against time $t$ normally (i.e., with pushbutton 10 of FIG. 1 unoperated) follows a sawtooth pattern $V_1$ with a relatively high repetition frequency. During a random period T, however, operation of pushbutton 10 reduces this repetition frequency to produce a modified sawtooth pattern $V_1$. By visually comparing two traces $S_1$ and $S_1'$ respectively generated with sweep voltages $V_1$ and $V_1'$ on screen 5, as shown in FIG. 2A, the operator can determine whether the normal sweep rate is too high and can readjust the selector 9 accordingly.

Figure 3:
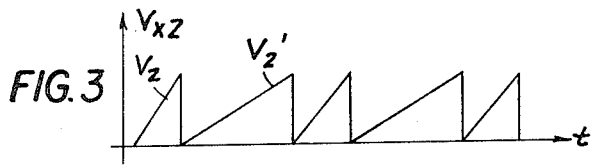
Figure 3A:
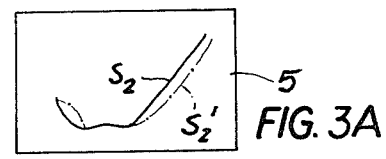

FIG. 3 represents a sweep voltage $V_{x2}$ which normally has a high-frequency sawtooth pattern $V_2$ but which, with pushbutton 10 depressed, shifts to a low-frequency pattern $V_2'$ during every other cycle. Thus, as illustrated in FIG. 3A, the observer sees two traces $S_2$ and $S_2'$ simultaneously projected onto the screen 5 if the transmission conditions differ significantly for the two sweep frequencies. The operator will then move the selector 9 to the lower test frequencies $f$ until the two traces merge.

Figure 4:
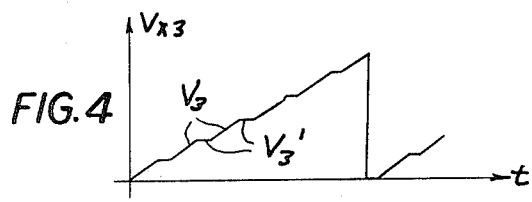
Figure 4A:
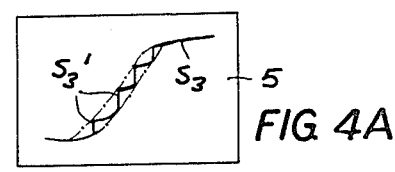

In FIG. 4 a sweep voltage $V_{x3}$ of sawtooth pattern is intermittently arrested, several times per cycle, to form short stretches of constant voltage $V_3'$ corresponding to intervals of unchanging operating frequency $f$. If the corresponding trace $S_3$, FIG. 4A, is significantly distorted by transients because of an excessively high basic sweep rate, the position of the beam shifts vertically during these intervals as indicated at $S_3'$. From the jagged configuration of curve $S_3$, therefore, the operator can determine that the sweep rate is too high. Advantageously, the beam of the cathode-ray tube is suppressed during the stretches $V_3'$ in order to avoid the appearance of highly intensified luminous spots at the locations $S_3'$.

Figure 5:
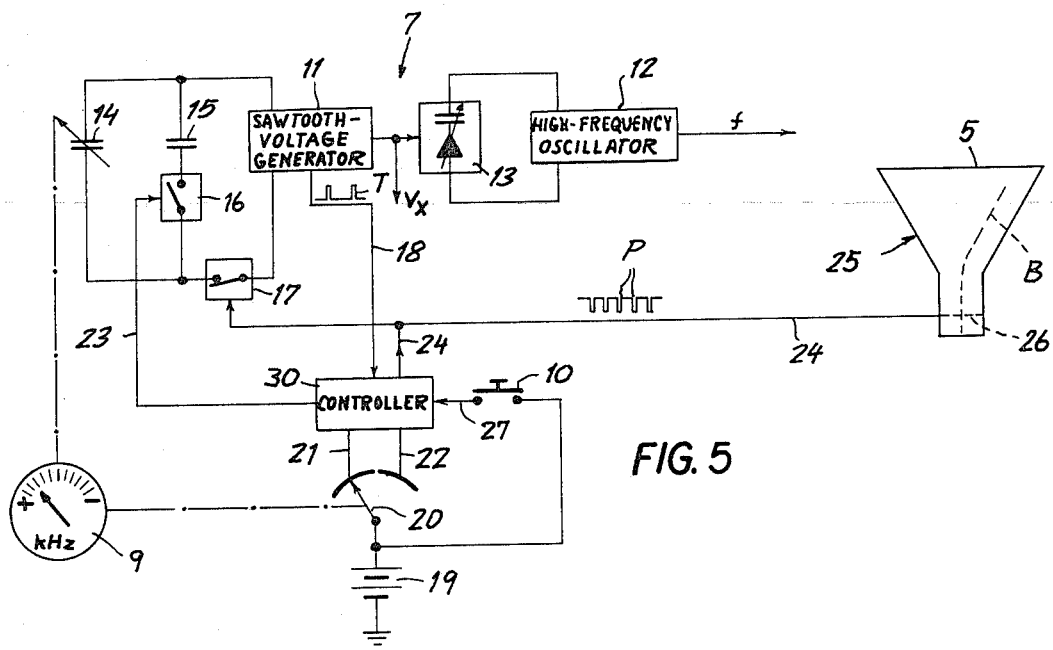
FIG. 5 is a more detailed circuit diagram of certain components of the system of FIG. 1.
Figure 6:
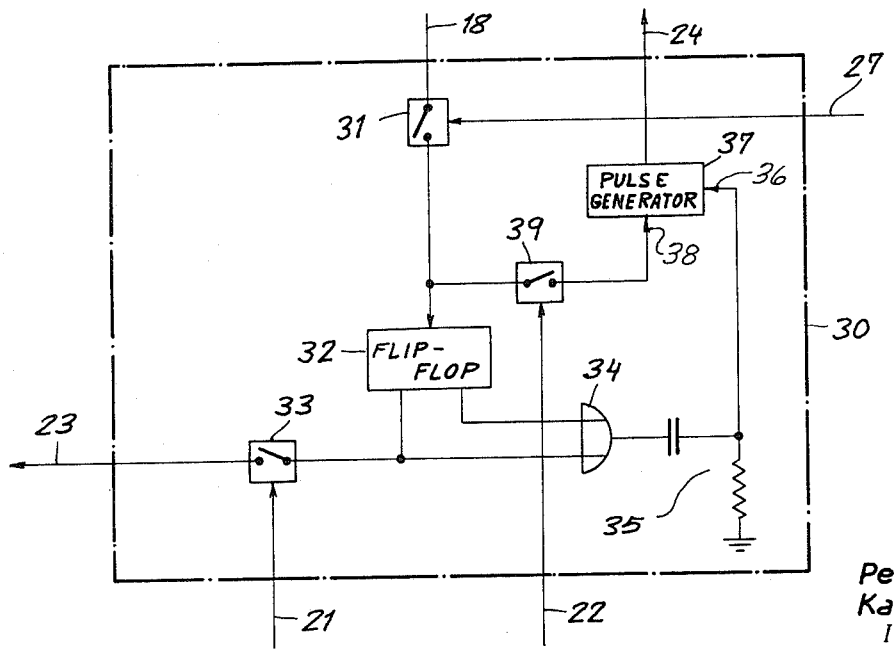
FIG. 6 is a still more detailed diagram of a unit shown in FIG. 5.

Reference will now be made to FIGS. 5 and 6 for a description of circuitry, to be used with the variable-frequency generator 7 of FIG. 1, for bringing about the several modes of sweep-voltage reduction described in conjunction with FIGS. 2 – 4.

Component 7 is shown in FIG. 5 as comprising a sawtooth-voltage generator 11 of conventional design whose repetition frequency is controlled by a pair of capacitors 14, 15 which are progressively charged through a resistance from a voltage source not shown and are periodically discharged through a Zener diode or other breakdown device whenever the stored charge reaches a predetermined value.

Capacitor 14, being variable, is coupled with the switch arm of selector 9 for adjustment of the slope of the output voltage $V_x$ which, besides being fed to the deflecting coil 6' of FIG. 1, is also applied to a varactor 13 to control the operating frequency of a high-frequency oscillator 12 delivering the test frequency $f$. Capacitor 15 is fixed and is normally open-circuited by means of an electronic switch 16 in series therewith. A similar switch 17, normally closed, lies in series with both capacitors. These switches can be reversed by signals on respective leads 23, 24 emanating from a controller 30 which is normally inoperative but can be activated by the closure of pushbutton switch 10 connected to a voltage source 19, here shown as a battery, via a lead 27.

Generator 11 includes a differentiation circuit, not shown, giving rise to a timing pulse T on a lead 18, extending to controller 30, at the end of each sawtooth cycle. The controller also has two further input leads 21 and 22 tied to respective contact arcs of a switch 20 whose arm is ganged with that of selector 9 and is connected to battery 19. With the selector 9 set to a range of relatively high repetition frequencies, switch 20 energizes the lead 21; in a range of relatively low repetition frequencies, lead 22 is energized.

Energization of lead 21 causes the closure of switch 16 by a signal on lead 23 during every other cycle, as measured by the pulses T fed to controller 30. Thus, the repetition frequency of voltage $V_x$ varies under these conditions in the manner illustrated in FIG. 3.

Energization of lead 22 causes the generation of a train of blanking pulses P on lead 24. These pulses, whose duration corresponds to the length of the short horizontal stretches $V_3'$ in FIG. 4, are also transmitted to a control grid 26 of cathode-ray tube 25 to suppress the beam B thereof. This results in the mode of operation described in conjunction with FIGS. 4 and 4A.

FIG. 6 shows details of controller 30. A gate 31, similar to the electronic switches 16 and 17 of FIG. 5, normally disconnects a stepping input of a flip-flop 32 from lead 18, this gate being closed upon the energization of lead 27 by the operation of pushbutton 10. Such closure causes the alternate setting and resetting of flip-flop 32 by pulses T at the beginning of consecutive sawtooth cycles, the set output of the flip-flop being connected to lead 23 by way of a gate 33 which is closed upon energization of lead 21. Both the set and the reset output of flip-flop 32 are connected, through an OR gate 34 and a differentiation circuit 35, to a resetting input 36 of a normally inoperative pulse generator 37 working into lead 24. An enabling input 38 of this generator is connected to lead 18 by way of gate 39 in series with gate 31, gate 39 being closed whenever lead 22 is energized. Generator 37, when activated, emits the blanking pulses P at a cadence which is high compared with the repetition frequency of sawtooth wave $V_x$.

Since, in the active state of controller 30, the pulse generator 37 is always restored to zero at the beginning of each cycle, the pulses P and therefore the standstill intervals $V_3'$ (FIG. 4) recur in invariable time positions within each sawtooth cycle. Thus, whether the system is set to work according to FIG. 3 or 4, the lowering of the repetition frequency occurs a predetermined number of times during a given number of sawtooth-wave cycles, i.e., several times per cycle or once every other cycle. The opening of gate 17 by the pulses P, in halting the charging of the two parallel-connected capacitors 14 and 15, holds the output voltage $V_x$ temporarily constant, thereby lowering the repetition frequency to zero during fractions of a cycle.

The operation according to FIG. 4 is effective even at frequencies so low that symmetrically triangular scanning would be ineffectual to reveal distortions since the forward trace will have disappeared upon the generation of the return trace.

Flip-flop 32 may be regarded as a binary counter which could also be designed to energize the lead 23 only once in every $n$ cycles (with $n>2$) whereby the trace $S_2'$ of FIG. 3A will be generated less often than the trace $S_2$ so as to appear with a relatively reduced brightness.

We claim:

1. A system for visually displaying a frequency-related parameter, comprising:
    a cathode-ray tube provided with an oscilloscope screen and with first and second beam-deflecting means, effective in mutually orthogonal directions, for generating a luminous trace on said screen;
    a supply of frequency-dependent signal voltage connected to said first beam-deflecting means;
    a variable-frequency oscillator working into said supply for giving rise to said signal voltage;
    a generator of sawtooth wave coupled to said oscillator for modulating the operating frequency thereof, said generator being connected to said second beam-deflecting means for creating a time base for said trace;
    manually operable selector means coupled to said generator for altering the repetition frequency of said sawtooth wave; and
    control means coupled to said generator and operable independently of said selector means for automatically and periodically lowering said repetition frequency to a reduced value substantially less than that established by said selector means.

2. A system as defined in claim 1 wherein said control means includes a source of switching pulses coupled to said generator for periodically lowering said repetition frequency a predetermined number of times during a given number of cycles of said sawtooth wave.

3. A system as defined in claim 2 wherein said source includes switchover means coupled to said selector means for modifying the cadence of said switching pulses in response to a selection of different ranges of said repetition frequency.

4. A system as defined in claim 1 wherein said control means comprises pushbutton-operable contacts.

5. A method of visually displaying a frequency-related parameter with the aid of an oscilloscope in which a beam trained upon a screen is deflected in two mutually orthogonal directions by a sawtooth-shaped time-base signal normally having a constant repetition frequency and by an input signal proportional to the parameter to be displayed, comprising the steps of temporarily lowering the repetition frequency of said time-base signal, observing the degree of coincidence between two traces projected upon said screen with said constant repetition frequency and with the lowered repetition frequency, and reducing the magnitude of said constant repetition frequency in the presence of a substantial deviation until said traces substantially coincide.

6. A method as defined in claim 5 wherein said repetition frequency is lowered periodically during successive cycles for a fraction of a cycle.

7. A method as defined in claim 6 wherein said repetition frequency is lowered to substantially zero during said fraction.

8. A method as defined in claim 7 wherein said beam is suppressed during periods of zero repetition frequency.

9. A method as defined in claim 6 wherein the lowering of said repetition frequency is repeated during each cycle.

10. A method as defined in claim 5 wherein said repetition frequency is lowered during alternate cycles for a full cycle.

* * * * *